United States Patent
Tagijev et al.

(10) Patent No.: US 11,753,697 B2
(45) Date of Patent: Sep. 12, 2023

(54) METHOD OF PROCESSING AND TREATMENT OF ALUNITE ORES

(71) Applicant: Elsad Tagijev, Libeznice (CZ)

(72) Inventors: Elsad Tagijev, Libeznice (CZ); Eldar Taghiyev, Libeznice (CZ); Lale Agajeva, Libeznice (CZ)

(*) Notice: Subject to any disclaimer, the term of this patent is extended or adjusted under 35 U.S.C. 154(b) by 0 days.

(21) Appl. No.: 16/965,940

(22) PCT Filed: Jan. 22, 2019

(86) PCT No.: PCT/CZ2019/000004
§ 371 (c)(1),
(2) Date: Jul. 29, 2020

(87) PCT Pub. No.: WO2019/149293
PCT Pub. Date: Aug. 8, 2019

(65) Prior Publication Data
US 2021/0071281 A1   Mar. 11, 2021

(30) Foreign Application Priority Data

Jan. 30, 2018 (CZ) .................................. CZ2018-45

(51) Int. Cl.
| | | |
|---|---|---|
| C22B 1/00 | (2006.01) | |
| C22B 1/14 | (2006.01) | |
| C01D 5/00 | (2006.01) | |
| C01F 7/0613 | (2022.01) | |
| C01F 7/08 | (2022.01) | |
| C22B 1/02 | (2006.01) | |
| C22B 3/12 | (2006.01) | |
| C22B 3/22 | (2006.01) | |

(52) U.S. Cl.
CPC ................. *C22B 1/14* (2013.01); *C01D 5/008* (2013.01); *C01F 7/0613* (2013.01); *C01F 7/08* (2013.01); *C22B 1/02* (2013.01); *C22B 3/12* (2013.01); *C22B 3/22* (2013.01)

(58) Field of Classification Search
CPC .... C22B 1/14; C22B 1/02; C22B 3/12; C22B 3/22; C01D 5/008; C01F 7/0613; C01F 7/08
See application file for complete search history.

(56) References Cited

U.S. PATENT DOCUMENTS

| | | | |
|---|---|---|---|
| 1,338,428 | A | 4/1920 | Downs |
| 4,024,087 | A | 5/1977 | Lainer |
| 4,230,678 | A | 10/1980 | Hartman |

FOREIGN PATENT DOCUMENTS

| | | |
|---|---|---|
| CA | 271816 | 6/1927 |
| CN | 104313346 | 1/2015 |
| CN | 106800015 | 6/2017 |
| CZ | 307974 | 9/2019 |
| GB | 1 375 996 | 12/1972 |
| SU | 819060 | 7/1981 |

OTHER PUBLICATIONS

International Search Report, PCT App. No. PCT/CZ2019/000004, ISA: EPO; dated Aug. 4, 2020.
Search Report of the Industrial Property Office of the Czech Republic, CZ App. No. PV 2018-45; dated Oct. 26, 2018.
Communication from Eurasian Patent Office, 2020.
Communication from Eurasian Patent Office, 2019.
Allowed Czech claims in Czech.
Allowed Czech claims in English.
PCT search results in Czech.
Search report from CZ IPO.

*Primary Examiner* — Steven J Bos
(74) *Attorney, Agent, or Firm* — Yuri Chumak; Dickinson Wright PLLC

(57) ABSTRACT

The alunite ore processing method consists of crushing, grinding and flotation of raw alunite ore. The enriched alunite ore is roasted at 520 to 620° C., the roasting time is 1 to 3 hours. The roasted alunite is leached with 5 to 20% sodium carbonate solution, which is in 100 to 110% of the stoichiometric amount required to bond the $SO_3$ aluminum sulfate in the alunite with leaching conditions of 70-100° C. for 0.5-2.0 hours. The obtained slurry contains all of the potassium sulfate from the alunite and all of the sodium sulfate obtained from sodium carbonate. In the insoluble residue remains all aluminium oxide and residual rock. The sulfate solution is separated from the insoluble residue and is converted with potassium chloride to potassium sulphate (fertilizer) and kitchen salt. The insoluble residue is treated by the Bayer method without the use of an autoclave and results in aluminium oxide (alumina) and quartz sand.

20 Claims, 1 Drawing Sheet

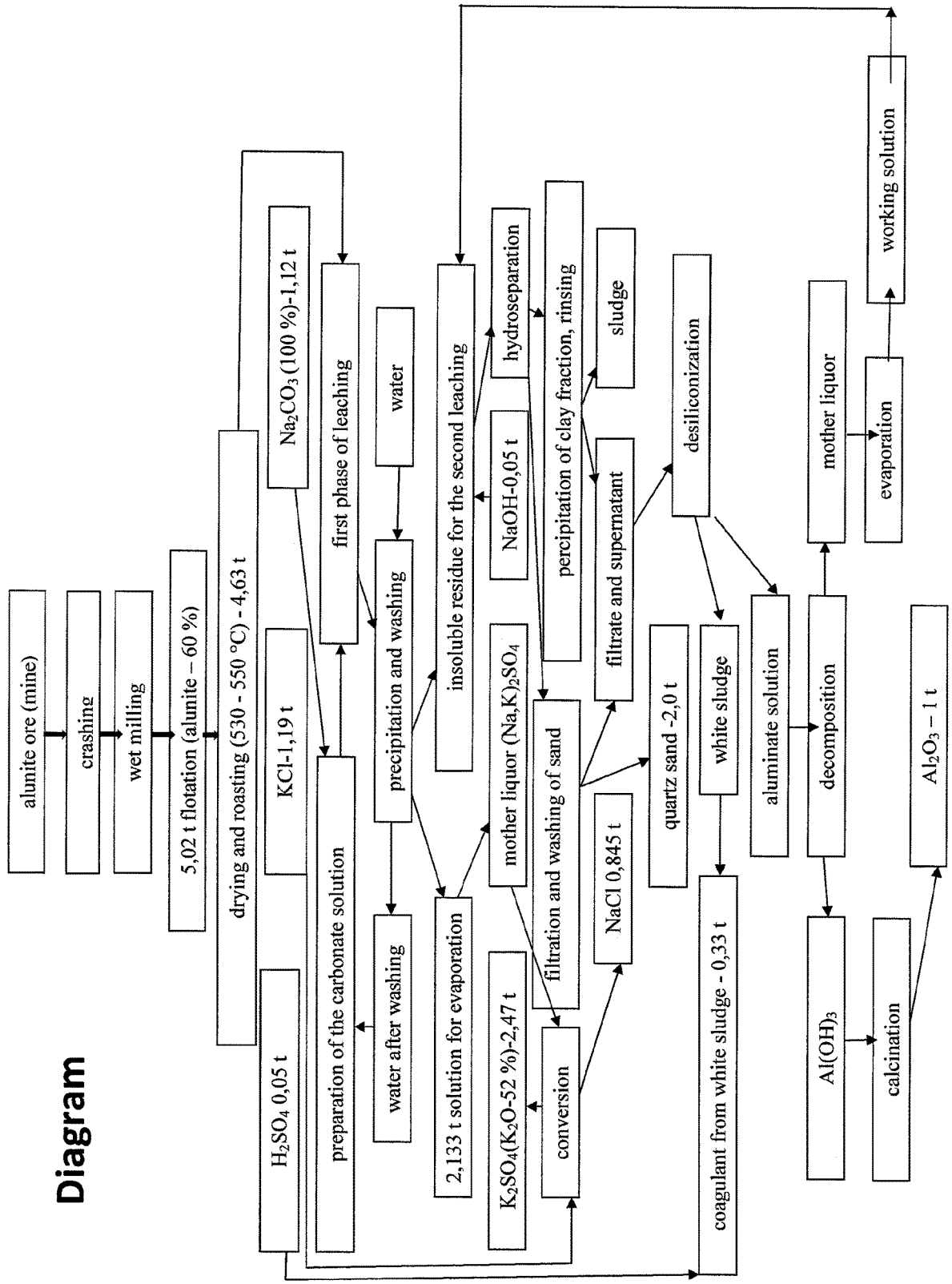

METHOD OF PROCESSING AND TREATMENT OF ALUNITE ORES

This application is a national stage application of PCT Application No. PCT/CZ2019/00004 filed under 35 U.S.C. § 371 on Jan. 22, 2019, which in turn claimed priority to Czech Patent Application No. PV 2018-45 filed on Jan. 30, 2018.

TECHNICAL FIELD

This invention relates to/concerns technology of alunite ore processing resulting in the production of $\gamma$-$Al_2O_3$ with the production of fertilizer potassium sulfate, kitchen salt, metallurgical aluminum oxide and quartz sand.

BACKGROUND ART

Alunite is a raw material for the aluminum and chemical industries. Industrial alunite ore deposits are common in the USA, China, Azerbaijan, Iran, Mexico, Kazakhstan, Ukraine, Russia and other countries. The presented invention concerns the processing of alunite ore with the production of fertilizer potassium sulphate, kitchen salt, metallurgical alumina and quartz sand.

An alkaline reduction method for processing alunite ore [1] is known. This method was used in the Ganja Aluminum Combine (GGC). Due to significant technological drawbacks (such as low alumina yield of less than 70 pollution of the environment by dust and gas, a need for rare and expensive raw materials, large quantities of solid waste from 5 tons per 1 ton of alumina and an undesirable by-product sulfuric acid) GGC ceased its operations in 1992 and to this date does not operate.

A method for processing of alunite ore was developed for the production of potassium fertilizers (SOP), sulfuric acid, alumina and quartz sand in Utah (USA) [2]. In this method, the alunite ore is roasted at 600° C. or lower with the release of $SO_2$, which leads to the production of sulfuric acid, and the roasted alunite is extracted with hot water to produce $K_2SO_4$(SOP). A reducing agent (excess oil or elemental sulfur vapors) should be introduced during roasting in order to acquire entire $SO_2$ aluminium sulphate. The combustion temperature of 600° C. allows to preserve $\gamma$-$Al_2O_3$ in an active form. However, leaching (in hot water at 80 to 99° C.) of the alunite T≤600° C. results in the loss of SOPs due to the formation of water-insoluble basic salts. The yield of SOP in the solution does not exceed 65 to 70%. Roasting of the alunite at 800 to 900° C. improves SOP yield to almost 100%, while $\gamma$-$Al_2O_3$ is converted into an insoluble form of $\alpha$-$Al_2O_3$. There is no floatation method that can divide $\alpha$-$Al_2O_3$ and quartz the insoluble residue in order to obtain metallurgical alumina.

The drawbacks were eliminated by the potash-alkaline method (Liner-Taghiyev) [3, 4, 5, 7], where the alunite roasted at the temperature of T≤550° C. was leached with potassium carbonate solution according to the reaction:

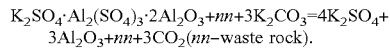
$3Al_2O_3$+$nn$+$3CO_2$($nn$–waste rock).

Up to 4 times more SOP and alumina ($\gamma$-$Al_2O_3$) is transferred into the solution, the metallurgical-$Al_2O_3$ remains in the insoluble residue. The SOP is obtained from the solution and the insoluble residue is processed by the Bayer method by means of leaching with the recycled solution of aluminate at T=80-90° C. to obtain metallurgical alumina and quartz sand. The disadvantage of this method is the use of a rare and expensive (including USA) potassium carbonate.

The foregoing drawbacks are addressed by the invention below.

The state of the art is further described in the following literature:

1. G. V. Labutin Recovery method for the processing of alunite. Autor. Svid. USSR No. 9911 a No. 108947 from year 1948.
2. Internet. Potash Ridge Corp. Technical report. Dated 24 Apr. 2017 Project No. 17M16.
3. A. I. Liner, V. I. Zakharova, Yu. A. Layner, El Taghiyev, Z. Pevzner Autor. Svid. SSSR No. 460709 d. 21 Oct. 1974.
4. E. I. Tagijev, patent of the Republic of Azerbaijan I 2001 0142 dated 2 Oct. 2001.
5. E. I. Tagijev, patent of the Republic of Azerbaijan I 2003 0210 dated 30 Oct. 2003.
6. E. I. Tagijev, I. S. Babayev, S. B. Rajabli, A. T. Khudiev, T. B. Aliyev Autofi. Svid. SSSR 5 No. 872456 dated 15 Jun. 1981.
7. E. I. Tagijev, Technology Of Complex Waste-fee Processing Of Alunite Ores. Baku, Elm, 2006, 504 pages (research monograph in Russian).

SUMMARY OF THE INVENTION

The processing of the alunite ore (alunite) consists first of the known steps: crushing, grinding and flotation of alunite ore. Flotation of the alunite ore proceeds with a flotoreagent and is proposed in the method according to the state of the art, point 2. The enriched alunite ore containing 25-95% preferably 60% of mineral alunite is further roasted at a temperature of 520 to 620° C., the roasting time is 1 to 3 hours. The roasted alunite, in accordance with the present invention, is further leached with 5 to 20% sodium carbonate solution, which is added in an amount of 100 to 110% of the stoichiometric amount required to bond the $SO_3$ aluminium sulphate in the alunite, that is $Na_2CO_3$ is added in an excess of 0 to 10% over the calculated stoichiometric coefficients of the reaction equation 1, at 70-100° C. for 0.5 to 2.0 hours. The obtained slurry solution contains all potassium sulphate from alunite and sodium sulphate obtained from sodium carbonate. In the insoluble residue remains all of aluminium oxide from alunite and waste rock, where the waste rock is silica-$SiO_2$ and clay (aluminum) aluminosilicate. The sulfate solution is further separated by either filtration or precipitation from an insoluble residue and is converted with potassium chloride to potassium sulphate (fertilizer) and kitchen salt. The insoluble residue is processed by the Bayer method without autoclaving and at a temperature of less than 100° C. to form aluminium oxide (alumina) and quartz sand.

In order to overcome the disadvantages of the prior art, it is proposed to replace the solution of potassium carbonate with a solution of calcined soda (1) and then to convert right after the first leaching the obtained sodium sulphate by the conversion method with KCl to potassium sulphate (fertilizer) and sodium chloride NaCl (2), which is the basic/fundamental inventive idea of this invention.

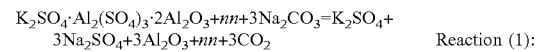    Reaction (1):

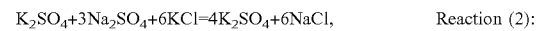    Reaction (2):

$3Al_2O_3$+nn is the insoluble residue, which is processed by the Bayer method without autoclaving to form aluminium oxide (alumina) and quartz sand. Alunite is roasted at 520 to 620° C., the time of roasting is 1 to 3 hours.

The roasted alunite is leached with 5 to 20% sodium carbonate solution in an amount of 100 to 110% of the stoichiometric amount required to bond the $SO_3$ aluminium sulphate in the alunite, that is $Na_2CO_3$ is added in an excess of 0 to 10% over the calculated stoichiometric coefficients of the reaction equation at 70 to 100° C. for 0.5 to 2.0 hours.

The products of this process are: $K_2SO_4$— fertilizer, NaCl—kitchen salt, $Al_2O_3$— metallurgical, $SiO_2$— quartz sand and coagulant for water purification [6].

Note: The United States is the second largest producer of sodium carbonate in the world, and Canada is the world's largest producer of potassium chloride (KCl).

EXAMPLES OF EMBODIMENTS OF THE INVENTION

Example 1

We take an alunite ore with an alunite content of 60% by weight, with the following composition, % by weight:

| $K_2O$ | $Al_2O_3$ | $SO_3$ | $H_2O$ | nn | Σ |
|---|---|---|---|---|---|
| 6.82 | 22.17 | 23.18 | 7.82 | 40 | 99.9 |

100 g of alunite (alumina) is crushed. Alunite (alunite ore) is further grinded, after the flotation enrichment it is roasted in an oven at T=550° C. for 1 hour and then leached in the solution of $Na_2CO_3$.

A sodium salt solution is prepared: 22.2 g of $Na_2CO_3$ is dissolved in 350 ml of water, the amount of soda is 105% wt. from stoichiometric. The leaching time is 1.5 hours at $T_{leach}$ 90° C.

Into solution are transferred: $K_2O$—99% by weight; $Na_2CO_3$-100% by weight; $Al_2O_3$— 0.5% wt.; SO3—9 8% wt. or $K_2O$=6.8 g, $Na_2O$=13 g, $SO_3$=2.3 g, $Al_2O_3$=0.1 g.

In the insoluble residue remains 62.2 g. $CO_2$ gas is formed.

The suspension is filtered and washed.

The filtrate with the washing water is evaporated.

We obtain a mixture of sulphates K, Na, where the sulphate K is 12.5 g, Na sulphate—29.8 g, the total of 42.3 g of the mixture. This is a mixture of sulphates obtained from the evaporated mixture of the filtrate and washed water.

It is required 23.7 g of KCl to produce 29.8 g of $Na_2SO_4$. This is reaction number 2: $K_2SO_4+3Na_2SO_4+6KCl=4K_2SO_4+6NaCl$, with $K_2SO_4$ already present in the alunite in the amount of 12.5 g.

The result is 36.6 g of $K_2SO_4$ plus 12.5 g of $K_2SO_4$ from alunite. Total of 49 g of $K_2SO_4$ and NaCl of 16.8 g.

Example 2

The method of treating the alunite ore consists of the following steps:
1. The alunite ore from the mine is crushed resulting in particles of 10 to 20 mm in size.
2. Followed by wet milling with a resulting particle size of the resulting powder under 0.074 micron (passed through a 200 mesh).
3. Enrichment of the ground alunite ore by means of flotation. The resulting weight of the enriched ore containing 60% of alunite is 5.02 t.
4. Drying and roasting of the enriched alunite ore from step 3 at 530 to 550° C. for one hour. After drying and roasting, the weight of alunite ore is 4.63 tons.
5. A solution from 1.12 t of $Na_2CO_3$ (100%) is prepared, the solution is prepared in a 5% excess over the stoichiometric balance of equation (1).

$$K_2SO_4 \cdot Al_2(SO4)_3 \cdot 2Al_2O_3 + \text{waste rock} + 3Na_2CO_3 = K_2SO_4 + 3Na_2SO_4 + 3Al_2O_3 + \text{waste rock} + 3CO_2, \quad (1)$$

where $3Al_2O_3$+waste rock is the insoluble residue. The waste rock contains silica, silica sand ($SiO_2$) and aluminosilicate (alumosilicate).

6. The enriched alunite ore, after drying and roasting from step 4, is leached in a solution of $Na_2CO_3$ prepared according to step 5 for 1.5 hours at 90° C. in the course of the reaction (1).
7. The slurry suspension from leaching (step 6) is filtered and the filter cake is washed. 2.133 t of solution for evaporation is formed (mother liquors containing $Na_2SO_4$ and $K_2SO_4$ and an insoluble residue).
8. The water after the washing of the cake can be used to prepare the solution of $Na_2CO_3$. The mother liquors from step 7 are evaporated/concentrated and converted according to the reaction (2) to $K_2SO_4$ fertilizer (2.47 t) and kitchen salt NaCl (0.845 t).

$$K_2SO_4 + 3Na_2SO_4 + 6KCl = 4K_2SO_4 + 6NaCl \quad (2)$$

1.19 t of KCl is used for the conversion.

9. The insoluble residue from step 5 ($3Al_2O_3$+waste rock) is processed by the Bayer method according to the reaction (3) without using an autoclave at a temperature below 100° C. 0.05 t of NaOH and the working solution are introduced into the reaction.

$$Al_2O_3 + 2NaOH = 2NaAlO_2 + H_2O. \quad (3)$$

Aluminium oxide (alumina) is formed and remains unchanged "waste rock", i.e. silica sand ($SiO_2$) and aluminosilicate.

10. The products from step 9 are hydroseparated into the sand fraction and the clay fraction (aluminosilicate and alumina).
11. The clay fraction from step 10 is precipitated and the filter cake is rinsed, with the formation of sludge in the sediment and the supernatant.
12. The sand fraction is washed and filtered to form the silica sand (2.0 t) and the filtrate.
13. The filtrate after filtration of the sand from step 12 and the supernatant after precipitation of the clay fraction from step 11 are combined. Thusly formed solution undergoes desilication to form a white sludge and aluminate solution (supernatant).
14. A reaction of the white sludge with $H_2SO_4$ (0.05 t) gives the coagulant from the white sludge (0.33 t).
15. The solution of aluminates resulting from the desilication from step 13 is further decomposed to form $Al(OH)_3$ and the mother liquor. The mother liquor may be further evaporated to form a working solution which may enter step 9 (re-concentration and recycling of water).
16. One ton of γ-$Al_2O_3$ is formed by calcination of $Al(OH)_3$.

BRIEF DESCRIPTION OF DRAWINGS

Diagram in FIG. 1 shows the method for processing and treating of alunite ores.

Advantages of the Invention Over the Prior Art

Production of metallurgical aluminium oxide (alumina, $Al_2O_3$) reaches 90

The amount of SOP produced is increased 4 times, with a yield of 90%.

Procedures that pollute the environment with dust and gas ($SO_2$) are eliminated.

There is no need to use precious and expensive raw materials.

This method is in fact free of solid waste.

In addition to the efficient production of metallurgical aluminite and SOP, this method allows to simultaneously produce other products: kitchen salt, quartz sand and coagulant for cleaning potable and industrial water.

INDUSTRIAL APPLICABILITY

According to the present invention, the method for the treatment of alunite is used to treat alunite ores with the production of $Al_2O_3$, as well as potassium sulphate, quartz sand, utility and potable water purification coagulant and kitchen salt as a by-product.

The invention claimed is:

1. Process for the treatment of alunite ore, comprising the following steps:
   crushing of alunite ore,
   grinding the alunite ore,
   enrichment of the grinded alunite ore by flotation to the content of at least 50% of the alunite ore by weight,
   roasting the enriched alunite ore at 520 to 620° C. for 1 to 3 hours,
   preparing a sodium carbonate solution comprising 5 to 20% sodium carbonate by weight, which is later used in a first leaching step, wherein the sodium carbonate solution is added to the roasted alunite ore in a quantity of 100 to 110% of the stoichiometric amount required to bond to sulphate ions from aluminum sulfate in the roasted alunite ore, thereby forming a sodium sulphate solution wherein sodium sulphate is present at a 0 to 10% excess over the stoichiometric balance of the equation, $K_2SO_4+Al_2(SO_4)_3+2Al_2O_3$+waste rock+ 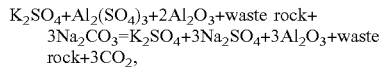
   $3Na_2CO_3=K_2SO_4+3Na_2SO_4+3Al_2O_3$+waste rock+$3CO_2$, separating the sodium sulphate solution from an insoluble residue of the first leaching step,
   converting the sodium sulphate in the preparing step with KCl to potassium sulphate and sodium chloride to form a suspension,
   filtering and washing the suspension with water to form a filtrate,
   evaporating the filtrate and the water, and
   a second leaching step comprising treating the insoluble residue by the Bayer method without the use of an autoclave to form a product comprising aluminium oxide and quartz sand.

2. The process for the treatment of alunite ore according to claim 1, wherein the sodium carbonate solution is prepared in a 5% excess over the stoichiometric balance of the following equation:

$K_2SO_4+Al_2(SO_4)_3+2Al_2O_3$+waste rock+ 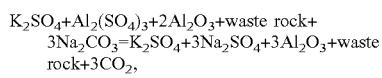
   $3Na_2CO_3=K_2SO_4+3Na_2SO_4+3Al_2O_3$+waste rock+$3CO_2$, where $3Al_2O_3$+waste rock forms the insoluble residue and comprises one or more of silica, silica sand, and aluminosilicate.

3. The process for the treatment of alunite ore according to claim 1, wherein the first leaching step is carried out at a temperature of 70 to 100° C. for 0.5 to 2.0 hours.

4. The process for the treatment of alunite ore according to claim 1, wherein the Bayer method without the use of an autoclave takes place with NaOH at a temperature below 100° C.

5. The process for the treatment of alunite ore according to claim 4, wherein the product from the Bayer method is processed by hydroseparation to produce a sand fraction comprising aluminosilicate and a clay fraction comprising γ-$Al_2O_3$.

6. The process for the treatment of alunite ore according to claim 5, wherein the clay fraction is precipitated to form a cake, which is washed, thereby forming a sludge comprising sediment and supernatant.

7. The process for the treatment of alunite ore according to claim 6, wherein the sand fraction is washed and filtered to produce silica sand and a second filtrate.

8. The process for the treatment of alunite ore according to claim 7, wherein the second filtrate and the supernatant are combined to form a solution, wherein the solution undergoes desilication to form a white sludge sediment and an aluminate solution supernatant.

9. The process for the treatment of alunite ore according to claim 8, wherein a reaction of the white sludge with sulfuric acid results in the formation of a coagulant.

10. The process for the treatment of alunite ore according to claim 8, further comprising the step of decomposing the supernatant to form Al(OH)3 and a mother liquor, wherein the mother liquor is further evaporated to form a working solution which is used as a starting reagent in a Bayer method reaction comprising re-concentration and recycling of water.

11. The process for the treatment of alunite ore according to claim 10, wherein the metallurgical γ-Al2O3 is formed by the calcination of $Al(OH)_3$.

12. Process for the treatment of alunite ore with sodium carbonate $Na_2CO_3$, comprising the following steps:
    crushing of alunite ore,
    grinding the alunite ore,
    enrichment of the grinded alunite ore by flotation to the content of at least 50% of the alunite ore by weight,
    roasting the enriched alunite ore at 520 to 620° C. for 1 to 3 hours,
    preparing a sodium carbonate solution comprising 5 to 20% sodium carbonate by weight, which is later used in a first leaching step, wherein the sodium carbonate solution is added to the roasted alunite ore in a quantity of 100 to 110% of the stoichiometric amount required to bond to sulphate ions from aluminum sulfate in the roasted alunite ore, thereby forming a sodium sulphate solution wherein sodium sulphate is present at a 0 to 10% excess over the stoichiometric balance of the equation, $K_2SO_4+Al_2(SO_4)_3+2Al_2O_3$+waste rock+ 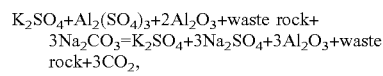
    $3Na_2CO_3=K_2SO_4+3Na_2SO_4+3Al_2O_3$+waste rock+$3CO_2$, separating the sodium sulphate solution from an insoluble residue of the first leaching step,
    converting the sodium sulphate in the preparing step with KCl to potassium sulphate and sodium chloride to form a suspension, filtering and washing the suspension with water to form a filtrate, evaporating the filtrate and the water, and a second leaching step comprising treating the insoluble residue by the Bayer method without the use of an autoclave to form a product comprising aluminium oxide and quartz sand to produce aluminium oxide, potassium sulphate, quartz sand, coagulant for the purification of utility and potable water, and kitchen salt.

13. Process for the treatment of alunite ore comprising the following steps:
   A. crushing said alunite ore,
   B. grinding said crushed alunite ore,
   C. enriching said ground alunite ore by flotation to the content of at least 50% of alunite by weight,
   D. roasting said enriched alunite ore at 520 to 620° C. for 1 to 3 hours,
   E. preparing a sodium salt solution that comprises 5 to 20% sodium carbonate ($Na_2CO_3$) by weight,
   F. combining said sodium salt solution and said roasted alunite ore, wherein said sodium salt solution is present in 100 to 110% of the stoichiometric amount required to bond to the sulfate ions from aluminum sulfate that is present in said roasted alunite ore, thereby forming a slurry, further wherein said slurry comprises a liquid component and an insoluble residue, further wherein said liquid component comprises potassium sulphate and sodium sulphate, and further wherein said insoluble residue comprises aluminum oxide,
   G. separating said liquid component from said insoluble residue,
   H. treating said liquid component with KCl to form potassium sulphate and sodium chloride,
   I. treating said insoluble residue by the Bayer method without the use of an autoclave to form aluminium oxide and quartz sand.

14. The process of claim 13, wherein said sodium salt solution is prepared in a 5% excess over the stoichiometric balance of the following equation:

$$K_2SO_4 + Al_2(SO_4)_3 + 2Al_2O_3 + \text{waste rock} + 3Na_2CO_3 = K_2SO_4 + 3Na_2SO_4 + 3Al_2O_3 + \text{waste rock} + 3CO_2.$$

15. The process of claim 13, wherein said combining of said sodium salt solution and said roasted alunite ore is carried out at a temperature of 70 to 100° C. for 0.5 to 2.0 hours.

16. The process of claim 15, wherein said step of treating said insoluble residue by the Bayer method without the use of an autoclave takes place at a temperature below 100° C., and with the presence of NaOH.

17. The process of claim 16, wherein the product of said treating step is processed by hydroseparation to produce a sand fraction comprising aluminosilicate and a clay fraction comprising $\gamma$-$Al_2O_3$.

18. The process of claim 17, wherein said sand fraction is washed and filtered to produce silica sand and a second filtrate, and said second filtrate and said resulting supernatant are combined and then desilicated, thereby forming a white sludge sediment and an aluminate solution supernatant.

19. The process of claim 18, wherein said white sludge is reacted with sulfuric acid, thereby forming a coagulant.

20. The process of claim 18, further comprising the step of decomposing said aluminate solution supernatant to form $Al(OH)_3$ and a mother liquor, wherein said mother liquor is further evaporated to form a working solution which is recycled for reuse as a starting reagent when treating said insoluble residue by the Bayer method.

* * * * *